(12) United States Patent
Acharya et al.

(10) Patent No.: US 7,774,288 B2
(45) Date of Patent: Aug. 10, 2010

(54) CLUSTERING AND CLASSIFICATION OF MULTIMEDIA DATA

(75) Inventors: Chiranjit Acharya, San Jose, CA (US);
Khemdut Purang, San Jose, CA (US);
Tsunayuki Ohwa, Kawasaki (JP); Mark Plutowski, Santa Cruz, CA (US);
Takashi Usuki, Yokohama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 225 days.

(21) Appl. No.: 11/436,142

(22) Filed: May 16, 2006
(Under 37 CFR 1.47)

(65) Prior Publication Data
US 2007/0271287 A1 Nov. 22, 2007

(51) Int. Cl.
G06F 7/00 (2006.01)
G06F 17/00 (2006.01)
G06F 17/30 (2006.01)
G06N 5/00 (2006.01)
(52) U.S. Cl. .......................................... 706/45; 706/45
(58) Field of Classification Search .................. 706/20, 706/45; 707/6
See application file for complete search history.

(56) References Cited
U.S. PATENT DOCUMENTS

| | | | |
|---|---|---|---|
| 5,566,291 A * | 10/1996 | Boulton et al. ............... 715/709 |
| 5,764,239 A | 6/1998 | Misue et al. |
| 5,963,746 A * | 10/1999 | Barker et al. .................. 712/20 |
| 6,105,046 A | 8/2000 | Greenfield et al. |
| 6,208,963 B1 | 3/2001 | Martinez et al. |
| 6,256,648 B1 | 7/2001 | Hill et al. |
| 6,282,548 B1 | 8/2001 | Burner et al. |
| 6,373,484 B1 | 4/2002 | Orell et al. |
| 6,460,036 B1 | 10/2002 | Herz |
| 6,473,851 B1 | 10/2002 | Plutowski |
| 6,484,199 B2 | 11/2002 | Eyal |
| 6,513,027 B1 | 1/2003 | Powers et al. |
| 6,539,354 B1 | 3/2003 | Sutton |
| 6,545,209 B1 | 4/2003 | Flannery et al. |
| 6,546,135 B1 | 4/2003 | Lin et al. |
| 6,572,662 B2 | 6/2003 | Manohar et al. |
| 6,584,456 B1 * | 6/2003 | Dom et al. ..................... 706/45 |
| 6,592,627 B1 * | 7/2003 | Agrawal et al. ............. 715/234 |
| 6,625,585 B1 * | 9/2003 | MacCuish et al. ............. 706/10 |
| 6,668,273 B1 | 12/2003 | Rust |
| 6,714,897 B2 * | 3/2004 | Whitney et al. ............. 702/189 |
| 6,725,227 B1 | 4/2004 | Li |

(Continued)

OTHER PUBLICATIONS

Pavel Moravec, Michal Kolovrat, and Vaclav Snasel, "LSI Wordnet Ontology in Dimension Reduction for Information Retrieval", 2004, pp. 18-26, ISBN 80-248-0457-3.

(Continued)

*Primary Examiner*—James Trujillo
*Assistant Examiner*—Jorge A Casanova
(74) *Attorney, Agent, or Firm*—Blakely, Sokoloff, Taylor & Zafman LLP

(57) ABSTRACT

Records including category data is clustered by representing the data as a plurality of clusters, and generating a hierarchy of clusters based on the clusters. Records including category data are classified into folders according to a predetermined entropic similarity condition.

44 Claims, 11 Drawing Sheets

U.S. PATENT DOCUMENTS

| | | | |
|---|---|---|---|
| 6,732,145 | B1 | 5/2004 | Aravamudan et al. |
| 6,738,678 | B1 | 5/2004 | Bharat et al. |
| 6,748,418 | B1 | 6/2004 | Yoshida et al. |
| 6,785,688 | B2 | 8/2004 | Abajian et al. |
| 6,801,229 | B1 | 10/2004 | Tinkler |
| 6,941,300 | B2 | 9/2005 | Jensen-Grey |
| 6,952,806 | B1 | 10/2005 | Card et al. |
| 6,996,575 | B2 | 2/2006 | Cox et al. |
| 7,003,515 | B1 | 2/2006 | Glaser et al. |
| 7,085,736 | B2 | 8/2006 | Keezer et al. |
| 7,158,983 | B2 * | 1/2007 | Willse et al. ............ 707/101 |
| 7,162,691 | B1 | 1/2007 | Chatterjee et al. |
| 7,165,069 | B1 | 1/2007 | Kahle et al. |
| 7,184,968 | B2 | 2/2007 | Shapiro et al. |
| 7,185,001 | B1 * | 2/2007 | Burdick et al. ............ 707/3 |
| 7,203,698 | B2 | 4/2007 | Yamashita |
| 7,216,129 | B2 | 5/2007 | Aono et al. |
| 7,330,850 | B1 | 2/2008 | Seibel et al. |
| 7,340,455 | B2 * | 3/2008 | Platt et al. ............ 707/3 |
| 7,371,736 | B2 * | 5/2008 | Shaughnessy et al. ......... 514/44 |
| 7,392,248 | B2 | 6/2008 | Bakalash et al. |
| 2001/0045952 | A1 | 11/2001 | Tenev et al. |
| 2002/0035603 | A1 | 3/2002 | Lee et al. |
| 2002/0042793 | A1 * | 4/2002 | Choi ............ 707/6 |
| 2002/0099696 | A1 | 7/2002 | Prince |
| 2002/0099731 | A1 | 7/2002 | Abajian |
| 2002/0099737 | A1 | 7/2002 | Porter et al. |
| 2002/0107827 | A1 | 8/2002 | Benitez-Jimenez et al. |
| 2002/0138624 | A1 | 9/2002 | Esenther |
| 2003/0011601 | A1 | 1/2003 | Itoh et al. |
| 2003/0033318 | A1 | 2/2003 | Carlbom et al. |
| 2003/0041095 | A1 | 2/2003 | Konda et al. |
| 2003/0041108 | A1 | 2/2003 | Henrick et al. |
| 2003/0084054 | A1 | 5/2003 | Clewis et al. |
| 2003/0089218 | A1 | 5/2003 | Gang et al. |
| 2003/0105819 | A1 | 6/2003 | Kim et al. |
| 2003/0154181 | A1 * | 8/2003 | Liu et al. ............ 707/1 |
| 2003/0217335 | A1 * | 11/2003 | Chung et al. ............ 715/514 |
| 2004/0083236 | A1 | 4/2004 | Rust |
| 2004/0090439 | A1 | 5/2004 | Dillner |
| 2004/0117367 | A1 | 6/2004 | Smith et al. |
| 2004/0133555 | A1 | 7/2004 | Toong et al. |
| 2004/0133639 | A1 | 7/2004 | Shuang et al. |
| 2004/0193587 | A1 | 9/2004 | Yamashita |
| 2004/0215626 | A1 | 10/2004 | Colossi et al. |
| 2004/0260710 | A1 * | 12/2004 | Marston et al. ............ 707/100 |
| 2005/0027687 | A1 | 2/2005 | Nowitz et al. |
| 2005/0033807 | A1 * | 2/2005 | Lowrance et al. ............ 709/204 |
| 2005/0060332 | A1 | 3/2005 | Bernstein et al. |
| 2005/0060350 | A1 | 3/2005 | Baum et al. |
| 2005/0114324 | A1 | 5/2005 | Mayer |
| 2005/0198073 | A1 | 9/2005 | Becks et al. |
| 2005/0289109 | A1 | 12/2005 | Arrouye et al. |
| 2005/0289168 | A1 | 12/2005 | Green et al. |
| 2006/0023724 | A1 | 2/2006 | Na et al. |
| 2006/0025175 | A1 | 2/2006 | Lapstun et al. |
| 2006/0112141 | A1 | 5/2006 | Morris |
| 2006/0122819 | A1 | 6/2006 | Carmel et al. |
| 2006/0167942 | A1 | 7/2006 | Lucas et al. |
| 2006/0218153 | A1 | 9/2006 | Voon et al. |
| 2007/0005581 | A1 | 1/2007 | Arrouye et al. |
| 2007/0061319 | A1 * | 3/2007 | Bergholz ............ 707/5 |
| 2007/0130194 | A1 | 6/2007 | Kaiser |
| 2007/0192300 | A1 | 8/2007 | Reuthers et al. |
| 2007/0233730 | A1 | 10/2007 | Johnston |
| 2007/0245373 | A1 | 10/2007 | Shivaji-Rao et al. |
| 2008/0133466 | A1 | 6/2008 | Smith et al. |
| 2008/0313214 | A1 | 12/2008 | Duhig et al. |

OTHER PUBLICATIONS

Ana B. Benitez, John R. Smith, Shih-Fu Chang, "MediaNet: A Multimedia Information Network for Knowledge Representation", in Proc., SPIE, 2001.

Lawrence Reeve and Hyoil Han, "Semantic Annotation for Semantic Social Networks", Using Community Resources, AIS SIGEMIS Bulletin, vol. 2, Issue (3 & 4), 2005, pp. 52-56.

Maria Ruiz-Casado, Enrique Alfonseca and Pablo Castells, "Automatic Extraction of Semantic Relationships for WordNet by Means of Pattern Learning From Wilipedia", Castells in Lecture Notes in Computer Science, vol. 3513, 2005.

George A. Miller, Richard Beckwith, Christiane Fellbaum, "Introduction to WordNet: An On-line Lexical Database", Int. J. Lexicography, 1990, vol. 3, pp. 235-244.

Sebastian, F., "Machine Learning in Automated Text Categorization", Mar. 2002, ACM, vol. 34, Issue 1, pp. 1-47.

Chen, et al., "Predicting Category Accesses for a User in a Structured Information Space", Aug. 2002, ACM, pp. 65-72.

* cited by examiner

| | | |
|---|---|---|
| 402a | 8498618 (404) | |
| 402b | 0TopOntology-Company-BroadcastStation-TVTokyo | |
| 402c | 0TopOntology-0Region-Asia-Japan | |
| 402d | Best, Underway, Sports, GolfCategory, Golf, Art, 0SubCulture, Animation, Family, FamilyGeneration, Child, Kids, Family, FamilyGeneration, Child | |
| ... | ... | |
| 402n | Kids, Cartoon | |
| ... | ... | |
| ... | ... | |
| ... | ... | |
| ... | 20040410 | |
| ... | 0930 | |
| ... | 1000 | |
| 402x | 30 | |

FIG. 4

CLUSTERING AND CLASSIFICATION OF MULTIMEDIA DATA

TECHNICAL FIELD

At least one embodiment of the present invention pertains to organizing and indexing data, and more particularly, to a method and apparatus for clustering and classification of multimedia data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2005, Sony Electronics, Incorporated, All Rights Reserved.

BACKGROUND

Clustering and classification are important operations in certain data mining applications. For instance, data within a dataset may need to be clustered and/or classified in a data-driven decision support system that is used to assist a user in searching and automatically organizing content, such as recorded television programs, electronic program guide entries, and other types of multimedia content.

Generally, many clustering and classification algorithms work well when the dataset is numerical (i.e., when data within the dataset are all related by some inherent similarity metric or natural order). Category datasets describe multiple attributes or categories that are often discrete, and therefore, lack a natural distance or proximity measure between them.

Accordingly, it would be beneficial to provide a system and method capable of clustering and classifying a category dataset.

SUMMARY

Records including category data is clustered by representing the data as a plurality of clusters, and generating a hierarchy of clusters based on the clusters. Records including category data are classified into folders according to a predetermined entropic similarity condition.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4 illustrates an example of an ontology onto which records containing category data are mapped in accordance with embodiments of the present invention;

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense. The scope of the present invention is defined only by the appended claims.

Figure 1:
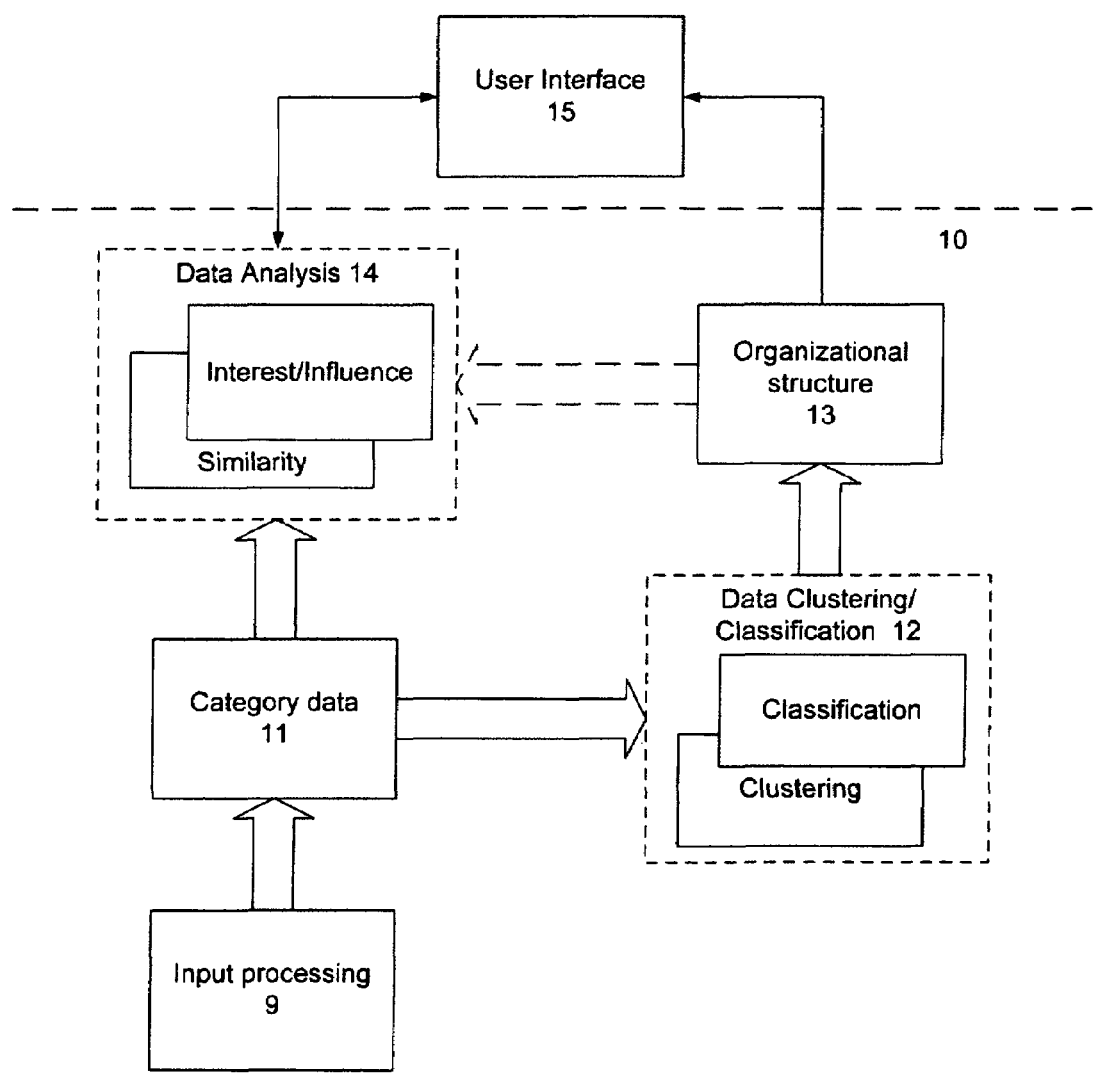
FIG. 1 is a diagram illustrating a system-level overview of an embodiment of the invention.

A system level overview of the operation of an embodiment of the invention is described by reference to FIG. 1. FIG. 1 is a diagram of a data system 10 to cluster and classify content, such as audio, video, and graphics, that is characterized by category data 11. Such content may be, for example, recorded TV programs, electronic program guide (EPG) entries, and multimedia content. The data system may further assist the user in tracking preferences of the user, and it may also provide recommendations to the user. The data system 10 can further be used by the user to search by example and/or by query.

Category data 11 is described in a vector space comprising multiple attributes or categories. Often the categories are discrete and lack a natural similarity measure between them. The data system 10 includes an input processing module 9 to preprocess input data, which contains both unstructured and semi-structured information, into category data and load the category data 11.

The category data 11 is grouped into clusters, and/or classified into folders by the clustering/classification module 12. The clustering and classification methods described herein can operate on any arbitrary category dataset.

In one embodiment, the clustering/classification module 12 may semantically augment the category data 11 prior to or during clustering or classification. One method for such semantic augmentation is by imputing values in unfilled attributes of the category data. The augmentation may reduce any scarceness associated with category data while increasing the overall quality of the category data 11 by increasing its information content to aid the clustering and classification processes.

Clustering of category data 11 is the process of identifying a set of underlying patterns in the distribution of category data points within a data set and grouping the data points into one or more groups or clusters based on some measure of similarity. The module 12 clusters the category data by using one or more clustering processes, including agglomerative hierarchical clustering, seed based hierarchical clustering, order-invariant clustering, and subspace bounded recursive clustering. In one embodiment, the clustering/classification module 12 merges clusters in a manner independent of the order in which the category data is received ("order-invariant clustering").

A knowledge of category distribution obtained in the process of clustering is used to construct a classifier for the same data space. Classification is the task of assigning new or unforeseen data points to one or more of the identified categories based on the same predefined proximity or divergence measure.

In one embodiment, the clustering/classification module 12 uses a folder-based classification system. The folder-based classification system allows a user to build a classifier by creating a group of folders. Each folder within the group is instantiated by a number of exemplary category data records.

In one embodiment, one or more of the exemplary records may be input by the user. Accordingly, a group of folders created by the user may act as a classifier such that new category data records are compared against the user-created group of folders and automatically assigned into the most appropriate folder. The folder-based classifier automatically creates a collection of folders, and automatically adds and deletes folders to or from the collection. The folder-based classifier may also automatically modify the contents of the folders in the collection as well as of other folders not in the collection.

The output of the clustering/classification module 12 is an organizational data structure 13, such as a dendrogram (cluster tree) or a matrix. A dendrogram may be used as an indexed organization of the category data or to select a suitable cluster of the data.

Many clustering applications require identification of a specific layer within a cluster tree that best describes the underlying distribution of patterns within the category data. In one embodiment, an output of the clustering/classification module 12 includes an optimal layer that contains a unique cluster group containing an optimal number of clusters.

A data analysis module 14 may use the folder-based classifiers and/or classifiers generated by clustering operations for automatic recommendation or selection of content. The data analysis module 14 may automatically recommend or provide content that may be of interest to a user or may be similar or related to content selected by a user. In one embodiment, the data analysis module 14 assigns category data records for new content items with the appropriate folders based on similarity.

A user interface 15 also shown in FIG. 1 is designed to assist the user in automatically organizing and searching content using the data system 10.

Although shown in FIG. 1 as specific separate modules, the clustering/classification module 12, organizational data structure 13, and the data analysis module 14 may be implemented as different separate modules or may be combined into one or more modules.

Figure 2:
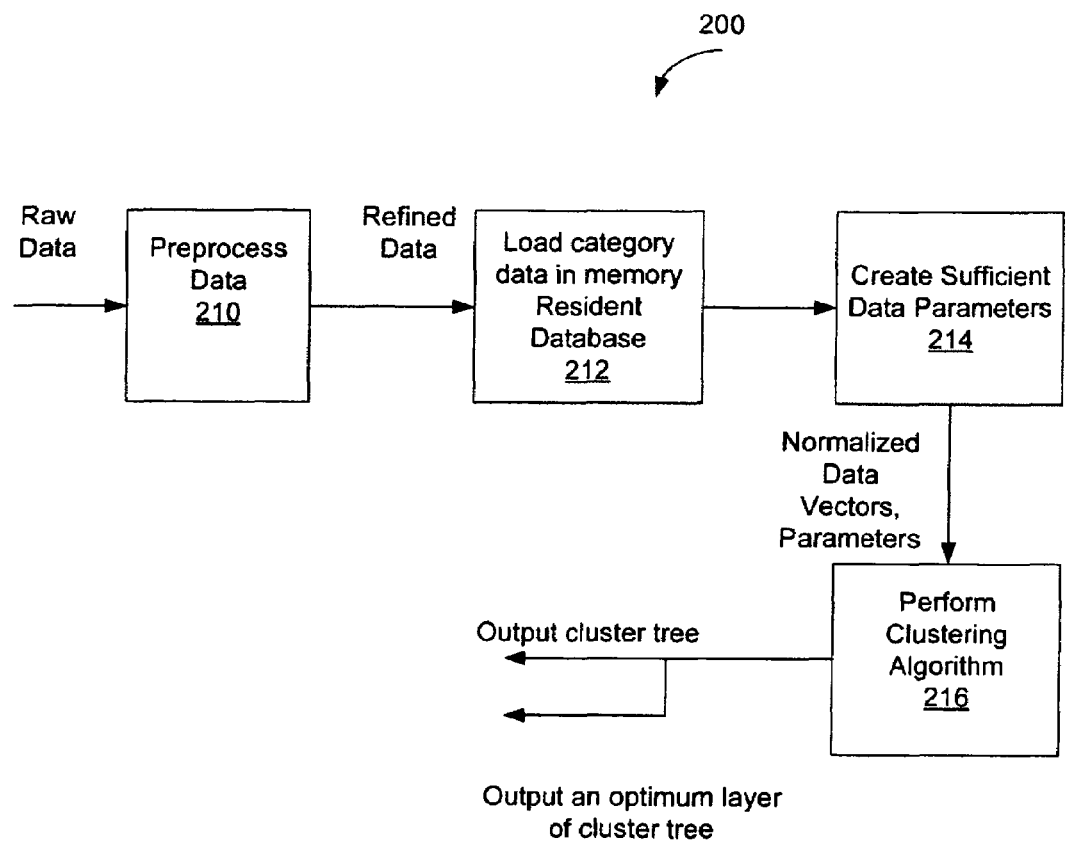
FIG. 2 is a flowchart of a method to cluster data according to an embodiment of the invention.

One embodiment of a system 200 that clusters category data is described with reference to FIG. 2.

The data input to data system 10 includes a plurality of records electronically input into the data system 10. As used herein, a record is a document, a video, photograph, music, or the like, or any combination thereof. Each record may be a descriptive data vector. In the case of EPG data, the data input to the data system 10 may be a set of records describing TV programs. The records may have a variety of attributes including channel, genre, actors, descriptive keywords, time of day, duration and TV rating.

Raw data, such as raw EPG data, may need some significant pre-processing in order to be usable as training and test data to the clustering and classification algorithms respectively. For instance, EPG data may include natural text that may need to be refined into category data.

Accordingly, pre-processing may be performed by input pre-processing module 210 to refine data into category data in the form of descriptive data vectors. The preprocessed category data may be loaded into a memory resident database or file by loading module 212. Each descriptive data vector may be transformed into a normalized term vector and other parameters for the clustering algorithm may be generated by module 214. Further, statistics about the dataset may be computed by module 214. A unified encoding scheme to represent both individual data vectors and clusters as normalized probability distributions in the attribute space may be used. A clustering algorithm is applied to the normalized term vectors to obtain a cluster tree or dendrogram by clustering module 216. In some embodiments, the cluster tree is the output, while in others, an optimum layer of the cluster tree is the output.

Figure 3:
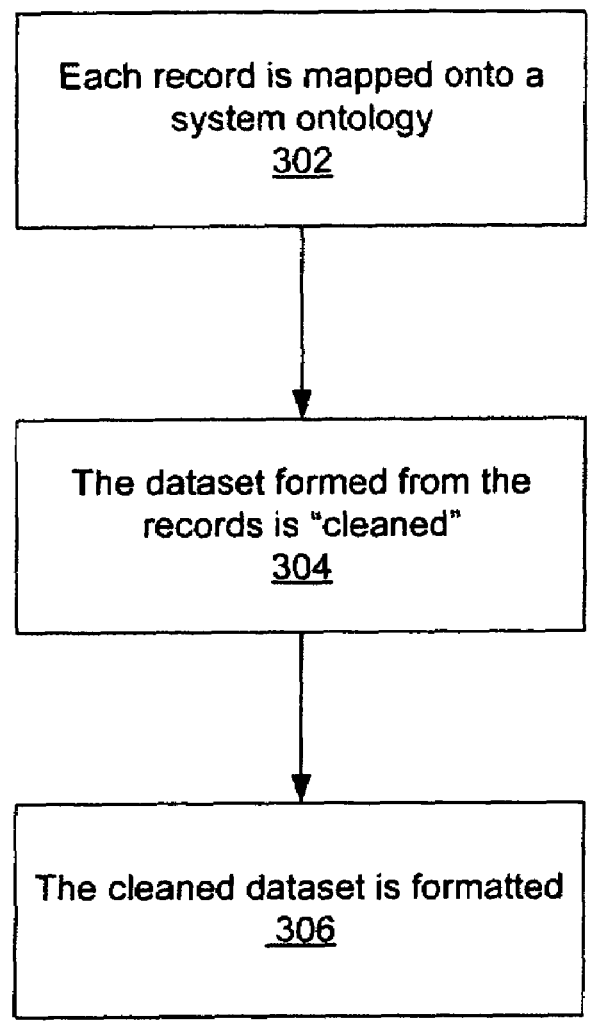
FIG. 3 is a flowchart of a method to preprocess data according to an embodiment of the invention.

One embodiment of a method 300 to be performed by pre processing module 210 in order to transform the data (blocks 212 and 216) to be used by the clustering algorithm is described with reference to flowchart shown in FIG. 3. Referring to FIG. 3, each record is mapped onto a system ontology (block 302). To increase the efficiency with which taxonomies are generated, and to produce more accurate results, each record is "cleaned" at block 304 and formatted (block 306).

In one embodiment, records within the received dataset are mapped onto predetermined fields of a system ontology at block 302. FIG. 4 illustrates an example of an ontology onto which records containing category data are mapped in accordance with embodiments of the present invention.

As shown in FIG. 4, the ontology 400 is characterized by a plurality of attributes 402 (i.e., $402a$ to $402x$), such that each attribute is further characterized by one or more terms 404. In one embodiment, the predetermined ontology adds abstract terms to particular attributes of a record to facilitate processing of the electronic record by the data system 10. The ontology thus provides a means for uniformly representing records in a manner that the data system 10 can recognize efficiently.

As shown in FIG. 4, a received record is a document describing a particular television program. Data mapped into a first attribute $402a$ (i.e., an "identification attribute") corresponds to record (e.g., a particular television program) and is characterized by the term "8498618." Data mapped into another attribute $402d$ (i.e., a "descriptor attribute") corresponds to keywords for the television program identified in attribute $402a$ and is characterized by the terms listed from "Best" to "Child." Data mapped into attribute $402n$ (i.e., a "genre attribute") corresponds to the genre for the television program identified in attribute $402a$ and is characterized by the terms "Kids" and "Cartoon." Data mapped into other attributes correspond to the date, start time, end time, duration, of the television program identified in attribute $402a$ and are characterized by the terms "20040410", "0930", "1000", and "30", respectively. In one embodiment, the term "***" represents missing data. In another embodiment, the same term appears multiple times within the same attribute (e.g., the keyword attribute 402d contains multiple instances of the term "Family"). In the illustrated embodiment, terms such as "0SubCulture" are abstract terms supplemented by the ontology.

Records are represented within the data system 10 as data vectors. The dimension of each vector corresponds to the total number of terms characterizing all attributes found in all records processed by the system (i.e., the global vocabulary of the system). Values assigned to elements of a vector represent the presence of a term within a corresponding record. For example, a vector element is represented in a binary fashion as either a 0 (indicating the absence of a term from a record) or a 1 (indicating the presence of a term in a record).

For example, suppose that the vocabulary for the entire collection of records and attributes (i.e., the global vocabulary) consists of only six terms: A, B, C, D, E, and F. Let a first record $d_1$ include the terms A, B, D, and E and a second record $d_2$ include the terms C, D, and F. Accordingly, the first record $d_1$ is binarily represented by a six-dimensional vector $d_1=\{1, 1, 0, 1, 1, 0\}$ and the second record $d_2$ is binarily represented by a six-dimensional vector $d_2=\{0, 0, 1, 1, 0, 1\}$. As shown above, the global vocabulary consists of only six terms. In practice, however, the global vocabulary includes thousands of terms, wherein any particular record includes only a relatively small number of terms. Accordingly, only a relatively few number of vector elements are assigned non-zero values. In practice, therefore, records are typically represented as highly "sparse" vectors that is difficult to process to efficiently generate taxonomies, and therefore, yield inaccurate results.

A record is cleaned at block 304 by one or more methods including removal of terms from attributes, splitting of attributes, and replacement of terms. In one embodiment, terms are removed from attributes that are not informative enough and are thus not generally useful in generating a folder set or in classifying records based on the generated folder set. Non-useful terms is identified as those that occur infrequently (e.g., once) within a particular attribute of a record. By removing terms from each record, the total number of terms within the attribute vocabulary is significantly reduced. For example, suppose the system receives 2154 records describing television programs playing over the course of a week. Such a collection of records may include 3016 description keywords, such that each record contains an average of 5.37 keywords, in which each keyword occurs an average of 4.29 times, and such that 1113 keywords occur just once. By removing the keywords occurring just once, the size of the description keyword attribute space is significantly reduced.

In some embodiments, input data is cleaned by pre-processing module 210 by splitting large record attributes (i.e., attributes characterized by a large number of unique terms) into a plurality of smaller sub-attributes characterized by a smaller number of unique terms. By splitting a large record attribute into smaller sub-attributes, probabilities is normalized over smaller, less sparse domains and yield more accurate results. Further, each sub-attribute is weighted to reflect its relative importance within the record.

In one embodiment, a large attribute is split into a plurality of smaller sub-attributes by grouping terms within the large attribute based on their frequency of occurrence within the large attribute. In this case, it is assumed that terms occurring more frequently are more relevant, and thus more important, than terms occurring less frequently. As a result, information indicating relevance levels of particular sub-attributes is imparted and used as a weighting value to reflect the relative importance of each sub-attribute. The size and number of the sub-attributes created as a result of the splitting is controlled, for example, by specifying the proportions of frequencies or value of frequencies desired in each sub-attribute.

In another embodiment, a large attribute is split into a plurality of sub-attributes by grouping semantically-related terms. In this case, meanings of words may be internally generated or obtained from a lexical reference system such as WordNet, a lexical reference system developed at the Cognitive Science Laboratory at Princeton University. As a result, information indicating a certain degree of so-called "common-sense" is imparted and used as a weighting value to reflect the relevance of each sub-attribute. The size and number of the sub-attributes created as a result of the splitting is controlled using statistics about particular terms and term frequencies in the attribute. In one embodiment, the total number of occurrences of terms within each sub-attribute is maintained within a predetermined range to control the degree of relatedness between terms in a particular sub-attribute or to control the abstractness of relationships between terms within a sub-attribute.

In one embodiment, terms that is grouped together into a sub-attribute according to their semantic interrelatedness are identified using an "is-a" (hypernym) chain relation as applied to nouns.

Consider, for example, the following hypernym chains:

1. cat, feline, carnivore, placental, mammal, vertebrate, chordate, animal, organism, living thing, object, entity 2. dog, canine, carnivore, placental, mammal, vertebrate, chordate, animal, organism, living thing, object, entity 3. umbrella, canopy, shelter, protective covering, covering, artifact, object, entity Based on the first hypernym chain, a cat is a feline, a feline is a carnivore, etc. Based on the second hypernym chain, a dog is a canine, a canine is a carnivore, etc. Based on the third hypernym chain, an umbrella is a canopy, a canopy is a shelter, etc. As shown, the terms "cat" and "dog" share "carnivore" hypernym relation much earlier in the chain than they share the "object" hypernym relation with the term "umbrella". Accordingly, the term "cat" is more semantically related to the term "dog" than it is related to the term "umbrella". As a result, a large attribute containing the terms "cat," "dog," and "umbrella" will be split into a first sub-attribute containing the terms "cat" and "dog" and a second sub-attribute containing the term "umbrella." As will be appreciated, semantic relationships between terms changes as the structural taxonomy of the lexical reference system changes or as classes are inserted into or removed from a particular relation path. It will be appreciated, however, that terms other than the nouns appearing in WordNet is grouped in a separate attribute space and downweighted if necessary.

In the example provided above, where the received records identify television programs, one large attribute may, for example, be divided into two smaller sub-attributes, such that the first sub-attribute, related to recreation, contains the terms "Recreation", "Pachinko", "Hobby", "Fun", "Entertainment", "Encore", "Swimming", "Skating", "Gymnastics", "Hunting", "Fishing", "Tennis", "Basketball", "Golf", "Soccer", "Baseball", and "Athletics" while the second sub-attribute, related to food, contains the terms "Tofu", "Food", "Diet", "Vitamin", "Sushi", "Soup", "Pudding", "Dessert", "Chocolate", and "Beverage". In one embodiment, each of the terms identified above is further divided into smaller sub-attributes according to a semantic relatedness between the terms.

In one embodiment, terms may be replaced by replacing specific terms with equivalent, more abstract terms. In this case, terms found, for example, in WordNet is replaced with equivalent, more abstract terms. As a result, the number of unique terms characterizing an attribute of a record is reduced because several specific terms are mapped onto the same abstract term. Moreover, vector representations of records become much less sparse because each abstract term appears in more records and there are proportionately more abstract terms appearing in each record. The size and number of the sub-attributes created as a result of the term replacements is controlled using statistics about particular terms and term frequencies in the attribute.

In the example provided above, where the received records include EPG data that identifies television programs, the specific terms "Brother", "Sister", "Grandchild", "Baby", "Infant", "Son", "Daughter", "Husband", "Mother", "Parent", and "Father" of an attribute can all be mapped onto an equivalent abstract term "relative". Similarly, the specific terms "Hunting", "Fishing", "Gymnastics", "Basketball", "Tennis", "Golf", "Soccer", "Football", and "Baseball" of an attribute can all be mapped onto an equivalent abstract term "sport".

By cleaning each record, the total number of terms to be processed by the data system 10 and/or the sparsity of vectors that represent records are reduced. As a result, the accuracy of results ultimately yielded by data clustering/classification module 12 may be increased.

In order to prepare the data for machine learning algorithms, the processing at block 306 may further include: transforming the input data format, transforming values, and listing values for each attribute. The processing at block 306 may be performed by module 214. In some embodiments, vector elements are numerically represented (as opposed to represented in a binary manner) by a value corresponding to the number of times that a term occurs in a record (i.e., the frequency of the term in the record) or by a normalized value corresponding to the number of times that a term occurs in a record in addition to the total number of terms the record contains (i.e., the normalized frequency of the term in the record).

Further, at block 306, the format of the data, the transformations expected, and the format of the output data may be specified in a language designed to describe metadata, such as Resource Description Framework (RDF). RDF employs a graph-based data model with a well-defined entailment relation. RDF is expressed in an extensible markup language (XML) format, the syntax of which explicitly specifies the parameters required and simplifies specification of the transformation process.

In one embodiment, a dataset D that is used for the clustering algorithm contains m records $d_1, d_2, \ldots, d_m$ and is characterized by an attribute space containing d attributes, $A_1$, $A_2, \ldots, A_d$ by module 214. A generic attribute space $A_i$, where $i=1, \ldots, d$, is characterized by any combination of $n_i$ unique terms contained within a vocabulary $V_i = \{v_i^1, v_i^2, \ldots, v_i^{n}\}$ specific to $A_i$. Accordingly, a global vocabulary V contains n unique terms characterizing the global attribute space A (i.e., a combination of all attributes within the dataset D), such that $$n = \sum_{i=1}^{d} n_i.$$

The dataset D is represented as an m×n matrix. Accordingly, each row of the m×n matrix corresponds to a vector-space representation of a particular record.

In one embodiment, the clustering process performed by clustering module 216 is a hierarchical operation that partitions the dataset D into k mutually exclusive clusters (where $k \leq m$), $C_1, C_2, \ldots, C_k$, such that the following conditions are satisfied:
1. For all $i=1, \ldots, k$, $C_i$; is a non-null subset;
2. For all $i,j=i, \ldots, k$, $i \neq j$, $C_i$ and $C_j$ are non-overlapping, i.e., $C_i \cap C_j$ is null; and
3. All the clusters, when combined together, are exhaustive, i.e., $$\bigcup_{i=1}^{k} C_i = D.$$

In some embodiments, hierarchical clustering is utilized because there typically exists no inherent metric or natural ordering between two arbitrary category data points. From the clustering prospective, this means that the centroid of a cluster in a category space is an undefinable entity.

There are two possible variations of hierarchical clustering: divisive and agglomerative. Divisive clustering builds the cluster tree in top-down fashion. Accordingly, the entire dataset is first considered to be one cluster, which is then recursively broken down into smaller and smaller subsets until each subset consists of only a single datum. Agglomerative clustering builds the cluster tree in bottom-up fashion, taking each data point as a singleton cluster to start off with, and then building bigger and bigger clusters by grouping similar data points together until the entire dataset is coalesced into one final cluster.

In the embodiments shown herein, agglomerative hierarchical clustering is used to reduce computational complexity. In other embodiments, divisive hierarchical clustering may also be used.

An example of a method 500 of a clustering operation to be performed by the clustering module 216 is discussed next with respect to FIG. 5.

Figure 5:
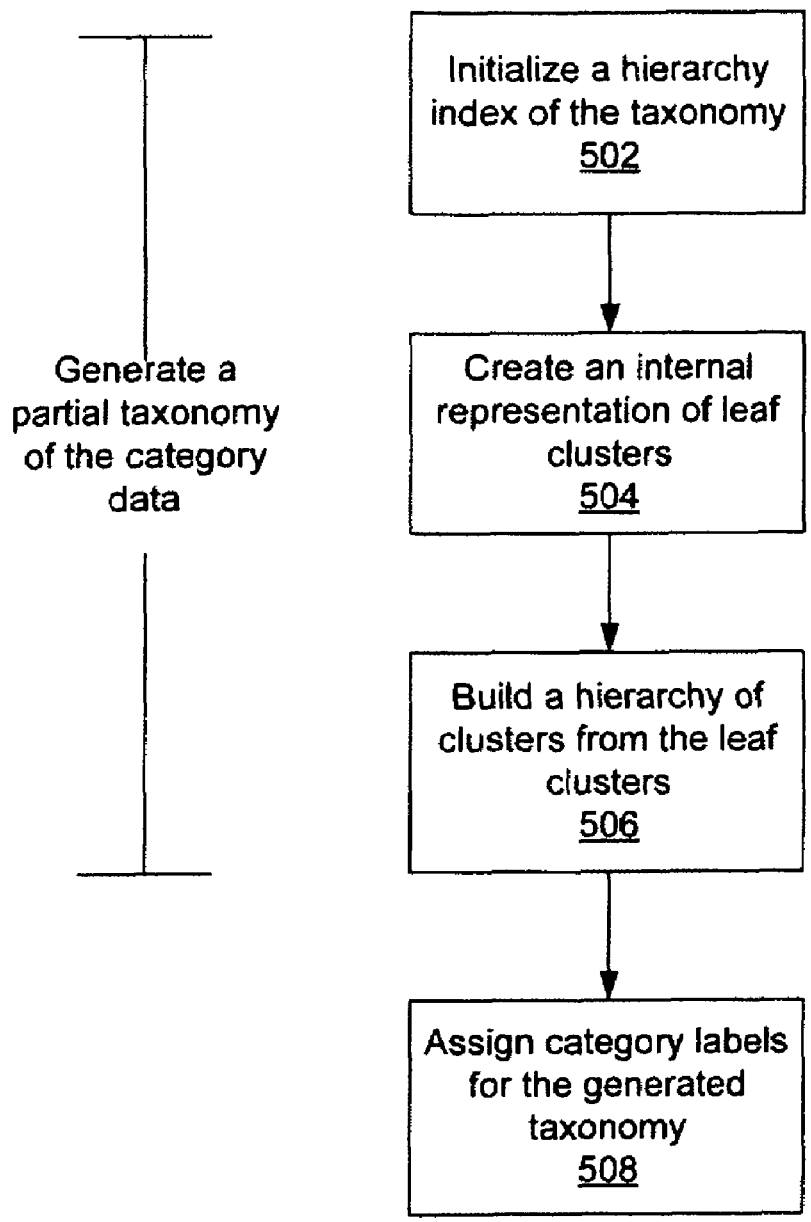
FIG. 5 is a flowchart of a method to cluster a category dataset in accordance with an embodiment of the present invention.

Referring to FIG. 5, a taxonomy of the category data is generated, for example, by initializing a hierarchy index (block 502), creating an internal representation of leaf clusters (block 504), and building a hierarchy of cluster sets from the leaf clusters (block 506). At block 508, the generated taxonomy is assigned to category labels.

In one embodiment, the hierarchy index identifies layers within the taxonomy and, as shown above, is represented by the hierarchy index variable, t. The hierarchy index is initialized by setting the hierarchy index variable, t, equal to 1 and setting each record within the dataset as a leaf cluster. As discussed above, each record $d_i \in D$ is identified by a vector. Accordingly, the bottommost layer of the taxonomy, $\Gamma_1$, contains a set of m clusters $C_1^1, C_1^2, \ldots, C_1^m$, each of which are also identified by the underlying vector of the corresponding record (i.e., $C_1^i = d_i$ for all $i=1, \ldots, m$). Thus, $\Gamma_t$, contains a set of m clusters $C_t^1, C_t^2, \ldots, C_t^m$. For the sake of ease of exposition, no formal distinction will be drawn between a leaf cluster and the underlying vector identifying the leaf cluster.

In order to create an internal representation of the leaf clusters, in one embodiment, a generic cluster $C_t^i \in \Gamma_t$ is internally represented by its conditional probability distribution $P(A|C_t^i)$, where $P(A=v_j|C_t^i)$ is the normalized probability of occurrence of the term $v_j$ in the cluster $C_t^i$. Similarly, a generic record $d_i \in D$ is internally represented by its conditional probability distribution $P(A/d_i)$, where $P(A=v_j/d_i)$ is the normalized probability of occurrence of the term $v_j$ in $d_i$, and where A is the global attribute space. The internal representation scheme described above is herein referred to as globally normalized representation (i.e., g-norm representation) because the term-frequency vectors of all records and clusters are normalized across the global attribute space A to generate the probability mass function representation.

In another embodiment, each generic record $d_i \in D$ or cluster $C_t^i \in \Gamma_t$ is internally represented as a set of d probability mass functions, one for each attribute. Accordingly, the internal representation of every record $d_i \in D$ is the disjunction of d locally normalized conditional probability distributions, $\{P(A_1/d_i)\hat{}P(A_2/d_i)\hat{} \ldots \hat{}P(A_d/d_i)\}$ and the internal representation of every cluster $C_t^i \in \Gamma_t$ is the disjunction of d locally normalized conditional probability distributions, $\{P(A_1/C_t^i) \hat{}P(A_2/C_t^i)\hat{} \ldots \hat{}P(A_d/C_t^i)\}$. The internal representation scheme described above is herein referred to as locally normalized (i.e., l-norm) representation.

Compared to g-norm, l-norm representation provides d degrees of freedom, as there are d entropy/information components corresponding to d probability distributions. The entropy/information components are linearly combined in any manner, and therefore any type of clustering is obtained varying the weight distribution across attributes. Moreover, g-norm representation propagates the effect of sparsity within one attribute to all other attributes whereas l-norm representation confines attribute-local sparsities to the same local attribute space.

Therefore, at block 504, internal representations of each leaf cluster, $C_t^1, C_t^2, \ldots, C_t^m$, is created by determining the conditional probability distribution $P(A_1|C_1^i)$ of each leaf cluster $C_1^i$ (for all i=1, ..., m), and setting the marginal probability $P(C_t^i)$ of each leaf cluster $C_t^i$ (for all i=1, ..., m) equal to 1/m.

After creating the internal representation of the leaf clusters, the hierarchy is built in block 506. In one embodiment, the hierarchy is generated according to a constrained hierarchical agglomerative clustering process, as illustrated in FIG. 6.

Figure 6:
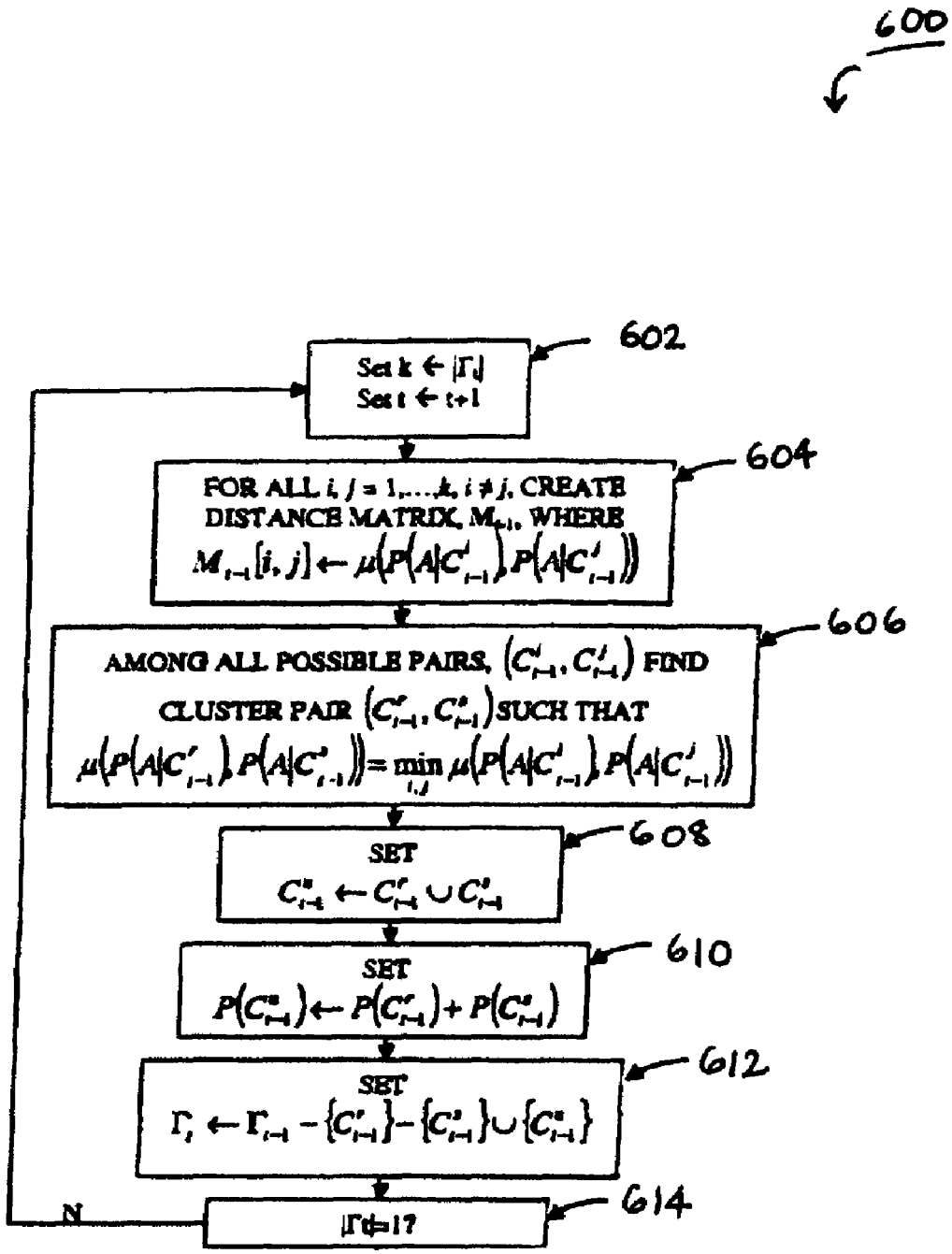
FIG. 6 is a flowchart of a method to generate a taxonomy of category data in accordance with an embodiment of the present invention.

Referring to FIG. 6, the hierarchy is built, for example, by setting a cluster number variable, k, and the aforementioned taxonomy layer variable, t, (block 602), creating a distance matrix $M_{t-1}$ (block 604), identifying a pair of clusters listed in the distance matrix $M_{t-1}$ according to a predetermined constraint condition and similarity condition (block 606), merging an identified cluster pair exhibiting the predetermined constraint and similarity conditions (block 608), setting the marginal probability of the merged cluster pair (block 610), and creating a new taxonomy layer containing the merged cluster pair in addition to all non-merged clusters (block 612), and determining whether the new taxonomy layer contains a single cluster (step 614). If it is determined that the new taxonomy layer contains a single cluster, then the non-truncated hierarchy is complete and the process proceeds to step 508. However, if it is determined that the new taxonomy layer does not contain a single cluster, then the process flow is directed back to block 602.

Upon initially performing block 602, the value of the cluster number variable, k, is inherited from block 502 and the value of the taxonomy layer variable, t, is inherited from block 602 and incremented by one. Subsequent values of the cluster number variable, k, and the taxonomy layer variable, t, are based on the number of clusters contained within each new taxonomy layer after cluster pairs have been merged and non-merged clusters have been isomorphically mapped from preceding taxonomy layers.

In embodiment, the distance matrix $M_{t-1}$ created in block 604 is an i×j matrix (i=j=1, ..., k, i≠j) listing all possible combinations of clusters present within the taxonomy layer $\Gamma_{t-1}$. In another embodiment, each entry within the distance matrix $M_{t-1}$ identifies a degree of similarity between a cluster identified in the $i^{th}$ row and a cluster identified in the $j^{th}$ column of the distance matrix $M_{t-1}$.

Where clusters are internally represented under the l-norm representation schema, the degree of similarity is represented by an entropic distance metric, $\mu$ that characterizes a measure of the divergence (or proximity) between every possible pair-wise combination of clusters present within the taxonomy layer $\Gamma_{t-1}$. In one embodiment, values for the entropic distance metric, $\mu$, is obtained using principles related to information-theoretic data compression, as described below.

Accordingly, and as applied to the present example of building the hierarchy, block 606 is at least partially accomplished by identifying a cluster pair listed within the distance matrix $M_{t-1}$ that, when merged, will minimize the amount of information loss $\delta l(\Gamma_{t-1}, \Gamma_t)$ incurred when $\Gamma_t$ is generated from $\Gamma_{t-1}$. Stated another way, block 606 is at least partially accomplished by identifying a cluster pair listed within the distance matrix $M_{t-1}$ that, when merged, will maximize the reduction of uncertainty as numerous, smaller-sized clusters are grouped into fewer, larger-sized clusters.

In an embodiment where the entropic distance metric, $\mu$, represents a measure of proximity (i.e., closeness) between clusters $C_{t-1}^i$ and $C_{t-1}^j$, clusters $C_{t-1}^r$ and $C_{t-1}^s$ are at least partially identified for which $\mu(P(A/C_{t-1}^i), \mu(A/C_{t-1}^j))$ is a maximum, resulting in the equivalence:

$$\min \delta l(\Gamma_t-1, \Gamma_t) = \max_{i,j} \mu(P(A|C_{t-1}^i), \mu(A|C_{t-1}^j)). \qquad (1)$$

In an embodiment where the entropic distance metric, $\mu$, represents a measure of divergence (i.e., farness) between clusters $C_{t-1}^i$ and $C_{t-1}^j$, clusters $C_{t-1}^r$ and $C_{t-1}^s$ are at least partially identified for which $\mu(P(A/C_{t-1}^i), \mu(A/C_{t-1}^j))$ is a maximum, resulting in the equivalence:

$$\min \delta l(\Gamma_t-1, \Gamma_t) = \max_{i,j} \mu(P(A|C_{t-1}^i), \mu(A|C_{t-1}^j)) \qquad (2)$$

Clusters $C_{t-1}^i$ and $C_{t-1}^j$ are identified and marked as $C_{t-1}^r$ and $C_{t-1}^s$, respectively, in block 606 if they have a maximum amount of overlap in the information that they contain about A.

In one embodiment, clusters are merged in block 608 by performing a union operation of all identified clusters $C_{t-1}^r$ and $C_{t-1}^s$ to form $C_{t-1}^u$ (i.e., $C_{t-1}^u = C_{t-1}^r \cup C_{t-1}^s$). Accordingly, each merged cluster $C_{t-1}^u$ represents the union of a plurality of clusters. As mentioned above each leaf cluster $C_1^u$ is identified by an underlying vector. In one embodiment, $C_{t-1}^u$ is identified by an underlying vector representing the centroid of the plurality of clusters it contains. For the sake of ease of exposition, no formal distinction will be drawn between a merged cluster and the underlying vector identifying the merged cluster.

In one embodiment, creating the new taxonomy layer at block 612 further includes isomorphically mapping the non-merged clusters onto the new taxonomy layer.

In accordance with some embodiments, a taxonomy, $\Gamma$, generated at block 506 is a partial taxonomy of the dataset D. A given layer $\Gamma_t$ within the partial taxonomy $\Gamma$ contains a set of k(t) clusters nested within a hierarchically higher layer $\Gamma_{t+1}$, containing a set of k(t+1) clusters (k(t+1)<k(t)), such that $\Gamma_t \subset \Gamma_{t-1}$. Thus, each cluster in $\Gamma_t$ is a subset of a cluster in $\Gamma_{t-1}$ and at least one cluster in $\Gamma_t$ is a proper subset of a cluster in $\Gamma_{t-1}$.

In one embodiment, the partial taxonomy $\Gamma$ comprises h nested layers $\Gamma_1 \subset \Gamma_2 \subset \ldots \subset \Gamma_h$, called a cluster-tree or dendrogram. The term h is upper-bounded by the size of the dataset, m. The bottom-most layer of the cluster tree, $\Gamma_1$, contains m singleton cluster nodes, corresponding to m data points. The top-most layer of the cluster tree, $\Gamma_h$ contains one cluster node containing all the m data points.

Referring back to FIG. 5, at block 508, category labels are assigned to each cluster created upon generating the taxonomy in block 506. In one embodiment, each category label is descriptive of the contents of the cluster it is assigned to and is assigned manually and/or automatically by the system by any known means. In another embodiment, the category label for each cluster corresponds to the centroid of that cluster. As all taxonomies generally represent a summary of the dataset from, the accuracy of the summary inherently depends on the amount of information that is retained within the taxonomy. Since the clustering process described above maximizes the reduction of uncertainty as the clusters are grouped into fewer and larger-sized clusters (i.e., minimizes the amount of information that is lost between each taxonomy layer), the accuracy of the summary of the dataset generated according to embodiments of the invention described above is maximized.

In some embodiments, the problem of clustering category metadata is reformulated in terms of information-theoretic data compression. Accordingly, if the value-set of a random variable X is compressed into a smaller-sized value-set of another random variable Y, and if both X and Y contain information about a third random variable Z, then the quality of compression may be judged from the fact that how much of the total information provided by X about Z is actually retained by Y (about Z). The information content of Y is always upper-bounded by (i.e., less than or equal to) the information content of X, which means there is always some finite amount of information loss when X is compressed to Y.

Applying the aforementioned information-theoretic compression principles to the context of generating a taxonomy of category data, the information content of $\Gamma_t$ about the abstract global attribute variable A is defined as: $I(A,\Gamma_t)=H(A)-H(A|\Gamma_t)$, where $H(A)$ is the absolute entropy, and $H(A|\Gamma_t)$ is the $\Gamma_t$-conditional entropy of A.

Similarly, the information content of a successive layer $\Gamma_{t+1}$ about the abstract global attribute variable A is $I(A, \Gamma_{t+1})$. During the agglomerative clustering process, when $\Gamma_{t+1}$ is generated from $\Gamma_t$, the information loss incurred in that transformation is $$\delta I(\Gamma_t,\Gamma_{t+1})=I(A,\Gamma_t)-I(A,\Gamma_{t+1})=H(A|\Gamma_{t+1})-H(A|\Gamma_t) \quad (3)$$

Thus, the amount of information loss is equal to the amount of increase in conditional uncertainty when $\Gamma_{t+1}$ is generated from $\Gamma_t$. In other words, minimizing the amount of information loss is equivalent to minimizing the amount of increase in conditional entropy. In order to minimize $\delta I(\Gamma_t, \Gamma_{t+1})$, two potential cluster candidates, $C_t^i, C_t^j \in \Gamma_t$, exist such that the overlap of the information content of $C_t^i$ and $C_t^j$ about A is maximum, i.e., the entropic divergence measure between their respective probability distributions, $P(A|C_t^i)$ and $P(A|C_t^j)$, is minimum. If $\mu P(A|C_i), P(A|C_j)$ is assumed to be the entropic distance metric between two arbitrary clusters, $C_i$ and $C_j$, then the equivalence between the two above-mentioned minimization operations is:

$$\min \delta I(\Gamma_t, \Gamma_{t+1}) \equiv \min_{i,j} \mu(P(A \mid C_t^i), P(A \mid C_t^j)).$$

In one embodiment, differential mutual information, $\delta I(\Gamma_t, \Gamma_{t+1})$ is determined based on the Jensen-Shannon divergence measure, quantifying the difference between two or more probability distributions which are transformed representations of category data vectors. There are several reasons for using Jensen-Shannon divergence measure: (i) it is built upon the Kullback-Leibler divergence, and therefore inherits all the properties of the Kullback-Leibler divergence; (ii) although based on the Kullback-Leibler measure, the Jensen-Shannon divergence measure does not suffer from the singularity problem; so, all computed Jensen-Shannon divergence measures are bounded and finite; (iii) Jensen-Shannon divergence is generalized to more than two distributions; (iv) the argument distributions is weighted, which is particularly relevant for clustering, since it makes possible to take into account the occurrence probabilities of different clusters while computing inter-cluster distances or proximities.

For any two arbitrary, mutually exclusive clusters, $C_t^i, C_t^j$, $\in \Gamma_t$, with respective likelihood probabilities $\pi_i$ and $\pi_j$, let the union be $C_t^u = C_t^i \cup C_t^j$, with corresponding likelihood probability $\pi_u = \pi_i + \pi_j$. The probability mass function representation of the joint cluster $C_t^u$ over the attribute space may be defined as the weighted mean of the probability functions of $C_t^i$ and $C_t^j$ $$\left(P(A|C_t^u) = \frac{\pi_i}{\pi_u} P(A|C_t^i) + \frac{\pi_j}{\pi_u} P(A/C_t^j), \right. \quad (4)$$

and the Jensen-Shannon divergence between $C_t^i$ and $C_t^j$ is $$JS(P(A \mid C_t^i) \| P(A \mid C_t^j)) = \quad (5)$$

$$\frac{\pi_i}{\pi_u} KL(P(A \mid C_t^i) \| P(A \mid C_t^u)) + \frac{\pi_j}{\pi_u} KL(P(A \mid C_t^j) \| P(A \mid C_t^u))$$

Using this Jensen-Shannon divergence functional, it may be shown that the differential mutual information between $C_t^i$ and $C_t^j$ is represented a linear function of their Jensen-Shannon divergence $$\mu(P(A|C_t^i),P(A|C_t^j))=(\pi_i+\pi_j)JS(P(A|C_t^i)\|P(A|C_t^j)) \quad (6)$$

Thus, for each i=1, . . . , m, and for each j=1, . . . , k, the entry M[i,j] created in block 604 denotes $\mu(P(A|C_t^i), P(A|C_t^j))$, (i.e., the entropic distance between the $i^{th}$ and $j^{th}$ clusters in $\Gamma_t$).

As discussed above, the l-norm representation schema transforms each record and cluster into a set of d locally normalized probability distributions, one normalized probability distribution for each of the d attributes. Therefore, the entropic proximity or divergence measure between two records or clusters is a weighted summation of the entropic similarity or dissimilarity measure between respective intra-attribute probability functions.

Assuming that the weight distribution over the attributes is $\{\omega_1, \omega_2, \ldots, \omega_d\}$. These weights can actually regulate the contribution of individual attribute-wise similarity or dissimilarity components. Extending the measures of globally normalized representation, we may get the divergence measure in the instance of locally normalized representation is $$M_t[i, j] \leftarrow \sum_{q=1}^{d} \exp(-\lambda \omega_q) \mu(P(A_q \mid C_t^i), P(A_q \mid C_t^j)), \quad (7)$$

and the entropy proximity measure is $$M_t[i, j] \leftarrow \sum_{q=1}^{d} \omega_q \exp(-\lambda \mu(P(A_q \mid C_t^i), P(A_q \mid C_t^j))), \quad (8)$$

where $\lambda$ is a gradient-controlling parameter of the entropic measure $\mu$.

In many embodiments, less weight may be given to the divergence between two probability components if the corresponding attribute is of a higher weight while more weight may be given the proximity between two probability components if the corresponding attribute is of a higher weight. For the divergence functional, the basic idea is to down-weight the divergence between two probability components if the corresponding attribute is of higher weight. On the contrary, for the proximity functional, the basic idea is to increase the contribution of the similarity measure between two probability components if the corresponding attribute is of higher weight.

In view of the above, the predetermined similarity condition, from which a cluster pair is at least partially identified in block 606, represents a minimal amount of information loss incurred as a result of generating a new taxonomy layer $\Gamma_t$ from a previous taxonomy layer $\Gamma_{t-1}$. Referring back to the principles of information-theoretic data compression, a high-quality data compression is achieved when the amount of information loss is minimized.

Figure 7:
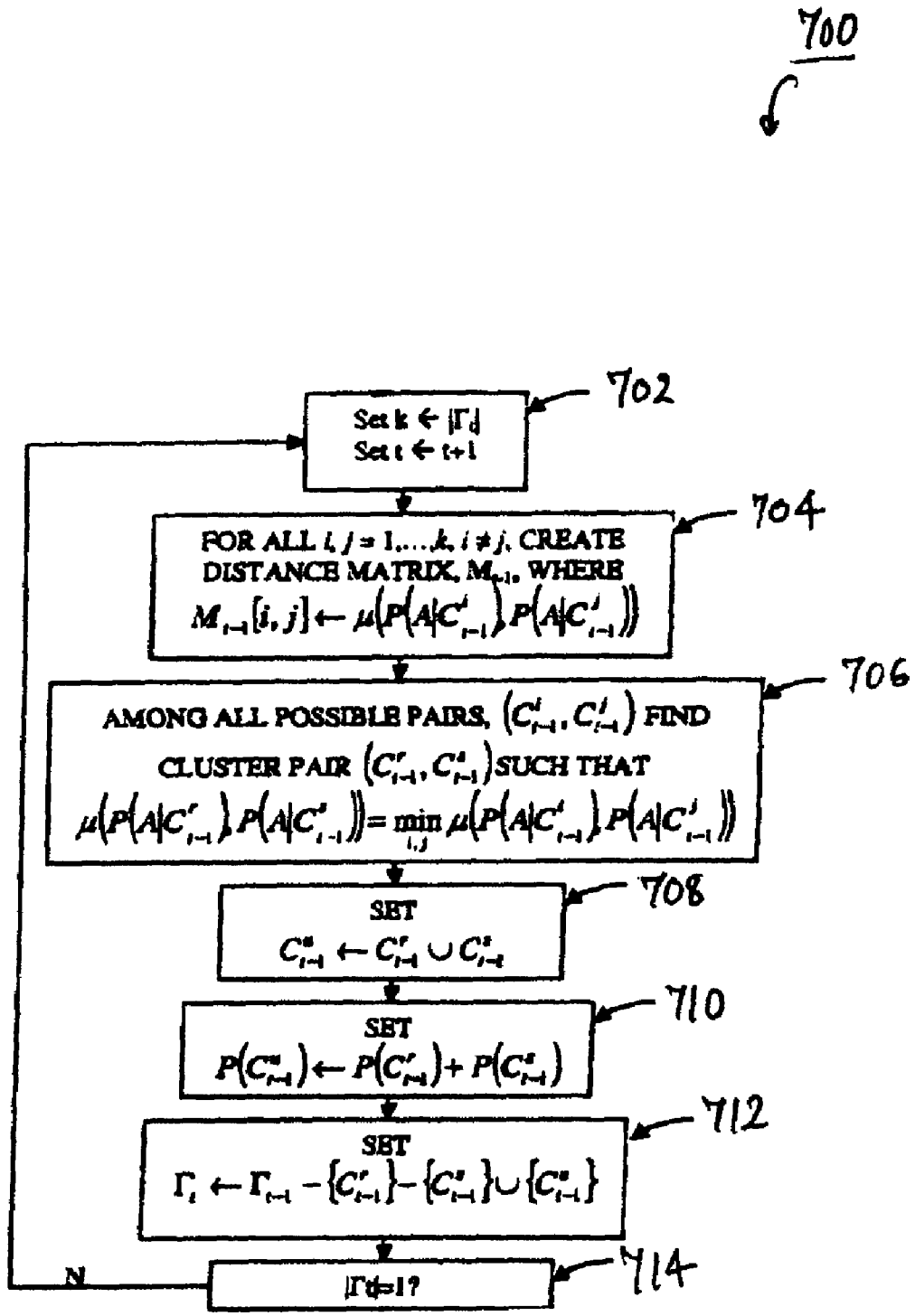
FIG. 7 is a flowchart of a method to generate a taxonomy of category data in accordance with an embodiment of the present invention.

Referring to FIG. 7, the hierarchy is built, for example, by setting the aforementioned cluster and taxonomy number variables, k and t, respectively (block 702), creating a distance matrix $M_{t-1}$ (block 704), identifying a pair of clusters listed in the distance matrix $M_{t-1}$ according to a predetermined similarity condition (block 706), merging an identified cluster pair exhibiting the predetermined similarity condition (block 708), setting the marginal probability of the merged cluster pair (block 710), creating a new taxonomy layer containing the merged cluster pair in addition to all non-merged clusters (block 712), and determining whether the new taxonomy layer contains a single cluster (block 714).

The distance matrix $M_{t-1}$ created in block 704 is created in the same manner as previously discuss with respect to block 604. Moreover, the predetermined similarity condition, from which a cluster pair is identified in block 706, represents a minimal amount of information loss incurred as a result of generating a new taxonomy layer $\Gamma_t$ from a previous taxonomy layer $\Gamma_{t-1}$ as similarly discussed with respect to block 606. Accordingly, block 706 is accomplished by identifying a cluster pair listed within the distance matrix $M_{t-1}$ that, when merged, will minimize the amount of information loss $\delta I(\Gamma_{t-1}, \Gamma_t)$ incurred when $\Gamma_t$ is generated from $\Gamma_{t-1}$. Stated another way, block 706 is accomplished by identifying a cluster pair listed within the distance matrix $M_{t-1}$ which, when merged, will maximize the reduction of uncertainty as numerous, smaller-sized clusters are grouped into fewer, larger-sized clusters.

An exemplary identification and merging process is accomplished by, for example, determining for all entries within the distance matrix $M_{t-1}$, $\min_{i,j}\mu(P(A|C_{t-1}^i), \mu(A|C_{t-1}^j))$, when the entropic distance metric, $\mu$, represents a measure of divergence, and determining whether the $$\mu(P(A|C_{t-1}^i), \mu(A|C_{t-1}^j)) = \min_{i,j}\mu(P(A|C_{t-1}^i), \mu(A|C_{t-1}^j)). \quad (9)$$

In embodiments where the entropic distance metric, $\mu$, represents a measure of proximity, identification and merging process is accomplished by determining, for all entries within the distance matrix $M_t$–$M_{t-1}$, $\max_{i,j}\mu(P(A|C_{t-1}^i), \mu(A|C_{t-1}^j))$.

In one embodiment, clusters is merged in block 708 in the same manner as previously described in block 608. Accordingly, if it is determined that $\mu(P(A|C_{t-1}^i), \mu(A|C_{t-1}^j)) = \min_{i,j} \mu(P(A|C_{t-1}^i), \mu(A|C_{t-1}^j))$, then $C_{t-1}^i$ and $C_{t-1}^j$ are marked $C_{t-1}^r$, and $C_{t-1}^s$ respectively, and are subsequently merged into a single cluster $C_{t-1}^u$ and at block 708. The process flow then continues to block 710 discussed above. Moreover, a new taxonomy layer is created in block 712 in the same manner as previously described in block 612.

As discussed above, the numerous embodiments discussed above provide taxonomy generated in accordance with a clustering system and method. The taxonomy that has been generated from the category dataset is used in various ways. For example, the taxonomy is used as an indexed organization of the category dataset or a layer within the taxonomy is selected to characterize and classify the category dataset.

Figure 8:
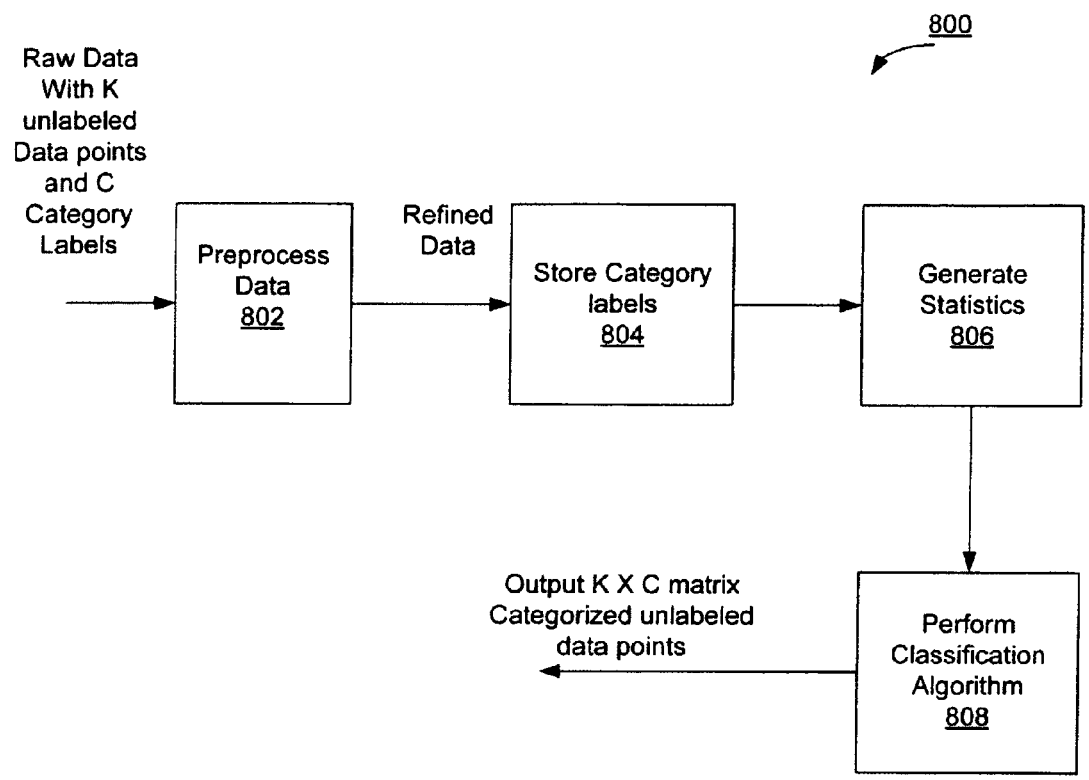
FIG. 8 is a flowchart of a method to classify data according to an embodiment of the invention.

FIG. 8 illustrates an embodiment of a process 800 of performing classification in accordance with embodiments of the present invention. The input data to input pre-processing module 9 may be data having k unlabelled data points and c category labels. The c category labels may be obtained from the clustering operation (e.g., block 508) or may be input by a user. Pre-processing 802 may be performed by input pre-processing module 9 to refine the raw data. In some embodiments, the pre-processing may be performed in a manner similar to the one shown in FIG. 3. Accordingly, the input data may be cleaned such that the efficiency with which folder sets are ultimately generated by the data system 10 is increased. At block 804, the c category labels may be loaded into a memory resident database or file. At block 808, a classification algorithm. (e.g., hard classification or soft classification) may be applied to the normalized term vectors to obtain a k×c matrix of categorized unlabelled data points.

A classifier defines decision boundaries in the attribute space, which separate different sample classes from each other in the data. In some embodiments, folder based classification, in which a user takes the initiative of building the classifier by creating a set of folders, $C_1, C_2, \ldots, C_k$, is used. Each folder may be instantiated by a number of exemplary data points. The folder-set as a whole may act as a classifier in the attribute space such that the exemplars reside.

In some embodiments, a soft variant of the classifier is used. In the soft variant, the output of classification may be logically described in the form of a simple m×k matrix, P, where m is the number of programs in the classification dataset, and k is the number of folders defined by the user. For each i=1, . . . , m, and for each j=1, . . . , k, the entry P[i,j] denotes $P(C_j|d_i)$, the likelihood probability of occurrence of the j-th class, given the i-th datum. The constraints over this likelihood probability distribution are that $$0 \leq P(C_j | d_i) \leq 1, \text{ and} \quad (i)$$

$$\text{For every } d_i \in D, \sum_{j=1}^{k} P(C_j | d_i) = 1. \quad (ii)$$

In some embodiments, a hard variant of the classifier is used. In the hard variant, the output of classification, like its soft sibling, may be logically described in the form of a m×k binary matrix, B. But, unlike soft classification, in this case, there is a one-to-one mapping between the dataset and the folder-set. So, every datum $d_i$ completely belongs to one and only one folder, say, $C_j : P(C_j|d_i) \in \{0,1\}\}$. As a result, the dataset D is crisply partitioned into k subsets corresponding to the k folders.

An additional feature of hard classification is the detection and separation of outliers. Accordingly, the user sets a threshold value as the effective field-radius of the folders. If the distance between a program datum and its designated folder centre is more than this threshold, then that datum is considered to be an outlier. All such outliers are assigned to a new folder.

Figure 9:
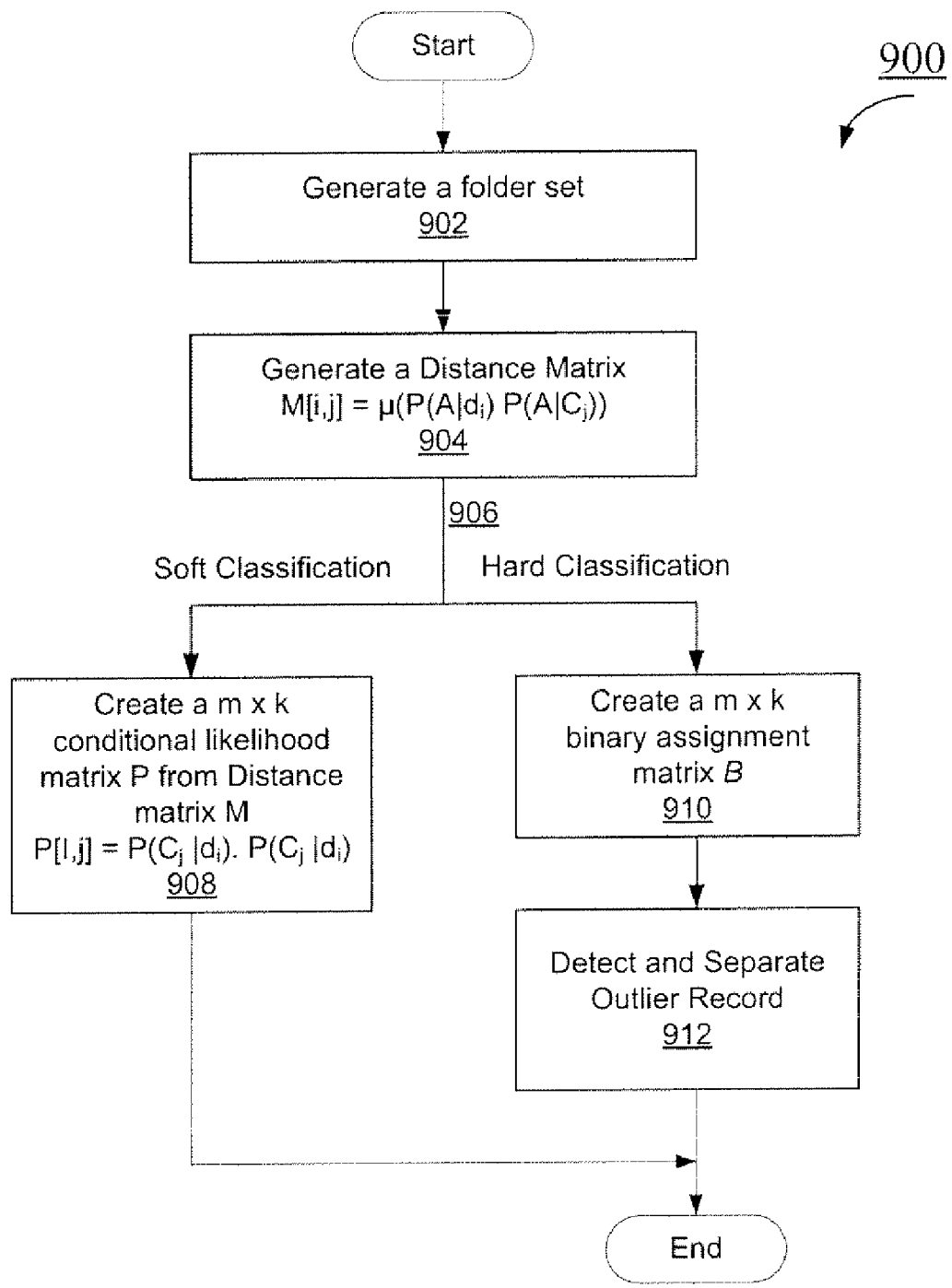
FIG. 9 is a flowchart of a method to classify category data according to an embodiment of the invention.

Referring to FIG. 9, a matrix is generated, for example, by creating a folder set (block 902), creating a distance matrix (block 904), and by performing either soft or hard classification (block 906).

In one embodiment, a folder set is generated, for example, by initializing an empty folder set containing k folders $C_1$, $C_2$, ..., $C_k$, creating an internal representation of the folders, and creating an internal representation of the records. To create an internal representation of the folders, for all i=1, ..., m, an internal representation $P(A|C_i)$ is generated. The internal representation of the folders $P(C_i)$ is set as $$|C_i| / \left| \sum_{j=1}^{k} Ci \right|.$$

To create an internal representation of the records, for all i=1, ..., m, an internal representation $P(A|d_i)$ is generated, and $P(d_i)$ is set as $1/m$.

For all j=1, ..., k, and i=1, ..., m, at block 904, a distance matrix is created, such that $M[i,j]=\mu(P(A|d_i) P(A|C_j))$. In one embodiment, the distance matrix M created in block 904 is an i×j matrix (where i=1, m and j=1, k) listing all possible record/folder combinations. In another embodiment, each entry within the distance matrix M identifies a degree of similarity between a record identified in the $i^{th}$ row of the distance matrix M and a folder identified in the $j^{th}$ column of the distance matrix M.

After creating the distance matrix M in block 904, the records $d_1, d_2, ..., d_m$ is classified in block 906. According to embodiments of the present invention, records is classified in block 906 according to either a soft classification process or a hard classification process.

Records are soft-classified using the folder set Γ by creating a m×k probability matrix P at block 908, where m is the number of records in the dataset D, and k is the number of folders in the folder set Γ created at block 902. Accordingly, for soft classification, at block 908, for all j=1, ..., k, and i=1, ..., m, a conditional likelihood matrix P is created, where $P[i,j]=P(C_j|d_i)$. $P(C_j|d_i)$ is computed from the distance matrix M. For each i=1, ..., m, and for each j=1, ..., k, the entry P[i,j] denotes $P(C_j|d_i)$ (i.e., the likelihood probability of occurrence of the j-th folder, given the i-th record). In one embodiment, $P(C_j|d_i)$ is calculated from the distance matrix M is $$P(C_j | d_i) = \left( \sum_{u=1}^{k} M[i, u] - M[i, j] \right) / \sum_{u=1}^{k} M[i, u], \quad (10)$$

where the constraints over this likelihood probability distribution are that:

$$0 \leq P(C_j | d_i) \leq 1, \quad \text{and} \quad (i)$$

$$\text{For every } d_i \in D, \sum_{j=1}^{k} P(C_j | d_i) = 1. \quad (ii)$$

According to the soft classification process, there is a one-to-many mapping between the dataset D and the folder set Γ. As a result, every record $d_i$ belongs to more than one folder and the dataset D is fuzzily partitioned using the k folders of the folder set Γ, such that each folder in the folder set Γ contains a ranked-ordered list of records, in order of highest entropic similarity to lowest entropic similarity.

Records are hard-classified using the folder set Γ by creating an m×k binary matrix B, where m is the number of records in the dataset D, and k is the number of folders in the folder set Γ created in block 902. For hard classification, at block 910, for all j=1, ..., k, and i=1, ..., m, a binary assignment matrix B is generated. $B[i,j]=1$ if $C_j$ is equal to arg max$_u$ $P(C_u|d_i)$. Otherwise, $B[i,j]=0$.

According to the hard classification process described above, there is a one-to-one-onto mapping between the dataset D and the folder set Γ. As a result, every record d completely belongs to one and only one folder $C_j$: $P(C_j|d_i) \in \{0,1\}$ and the dataset D is crisply partitioned into k subsets corresponding to the k folders.

Where the records are classified using the aforementioned hard classification process, an embodiment of the present invention provides for the detection and separation of outlier records (i.e., records within the dataset D that are not adequately described by the folder set Γ) at block 912. In one embodiment, outlier records is detected within the binary matrix B by identifying, for all i=1, ..., m, folders in j, such that $B[i,j]=1$. The record/folder combination at B[i,j] is then identified within the distance matrix M. If the entry at M[i,j] is greater than a threshold value ε, then the record $d_i$ is determined to be an outlier and subsequently classified into a new folder. As used herein, the threshold value ε represents the effective field-radius of the folders within the folder set Γ. Accordingly, if the entry at M[i,j] is greater than ε, the record $d_i$ is too dissimilar from folder $C_j$ to be considered as properly classifiable by folder $C_j$. In one embodiment, the threshold value ε is set by the user.

In practice, the methods described herein may constitute one or more programs made up of machine-executable instructions. Describing the methods with reference to the flowchart in FIGS. 2-3 and 5-9 enables one skilled in the art to develop such programs, including such instructions to carry out the operations (acts) represented by the logical blocks in the figures on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions is executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic, etc. ... ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in FIGS. 2-3 and 5-9 without departing from the scope of the invention and that no particular order is implied by the arrangement of blocks shown and described herein.

Figure 10A:
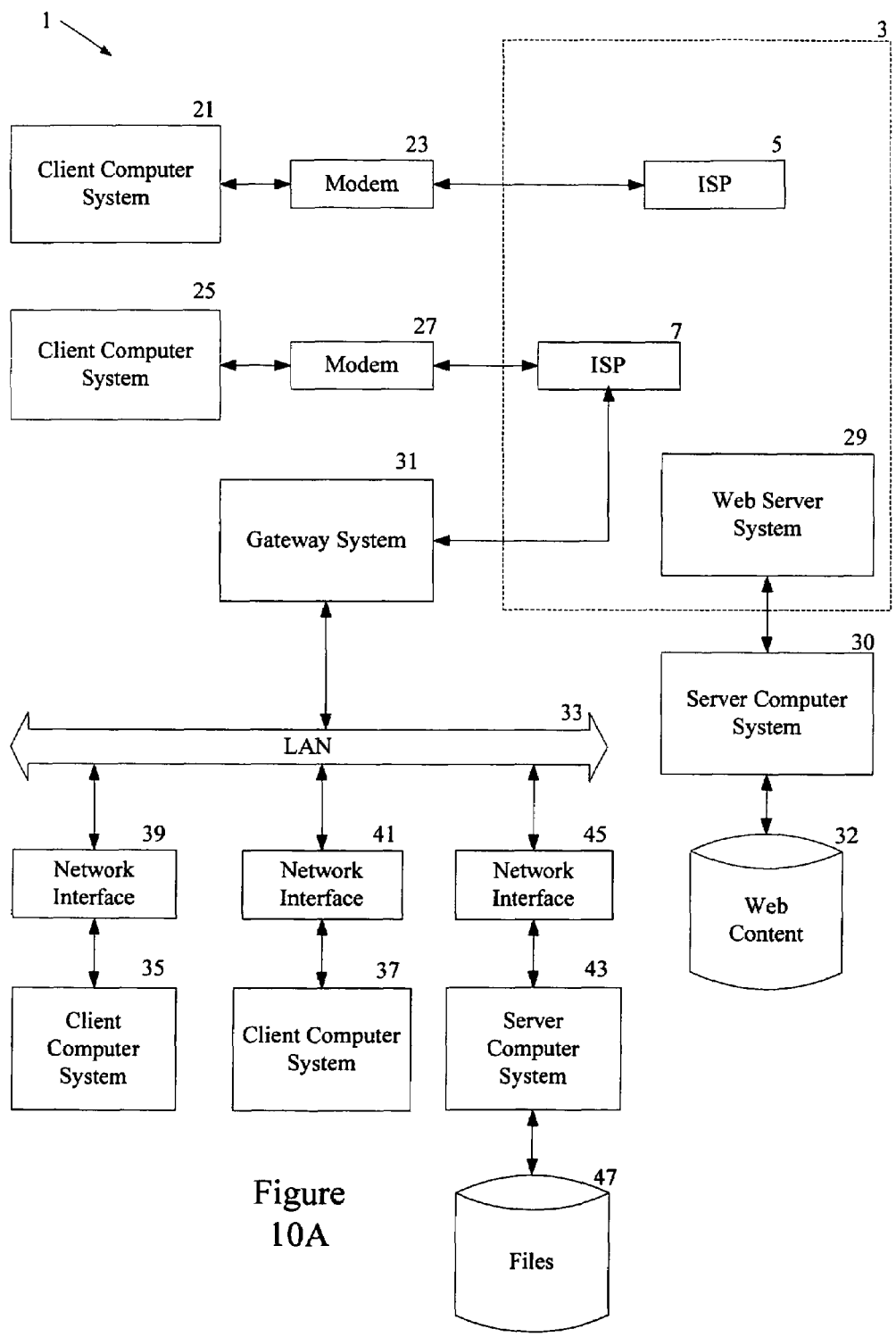
FIG. 10A is a diagram of one embodiment of an operating environment suitable for practicing the present invention.
Figure 10B:
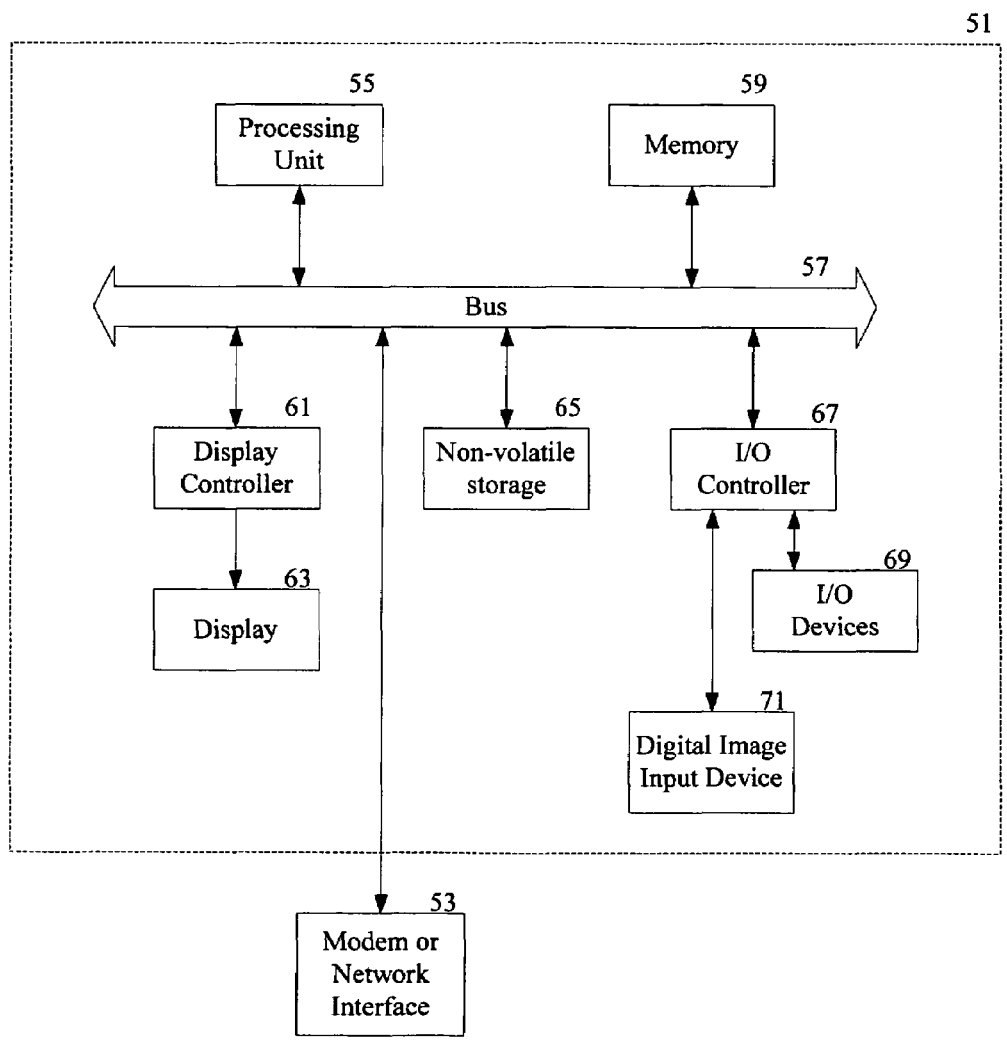
FIG. 10B is a diagram of one embodiment of a computer system suitable for use in the operating environment of FIG. 10A.

The following description of FIGS. 10A-B is intended to provide an overview of computer hardware and other operating components suitable for performing the methods of the invention described above, but is not intended to limit the applicable environments. One of skill in the art will immediately appreciate that the embodiments of the invention is practiced with other computer system configurations, including hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 10A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 29 which is considered to be "on" the Internet. Often these web servers are provided by the ISPs, such as ISP 5, although a computer system is set up and connected to the Internet without that system being also an ISP as is well known in the art.

The web server 29 is typically at least one computer system which operates as a server computer system and is configured to operate with the protocols of the World Wide Web and is coupled to the Internet. Optionally, the web server 29 is part of an ISP which provides access to the Internet for client systems. The web server 29 is shown coupled to the server computer system 30 which itself is coupled to web content 32, which is considered a form of a media database. It will be appreciated that while two computer systems 30 and 32 are shown in FIG. 10A, the web server 29 and the server computer system 30 is one computer system having different software components providing the web server functionality and the server functionality provided by the server computer system 30 which will be described further below.

Client computer systems 21, 25, 35, and 37 can each, with the appropriate web browsing software, view HTML pages provided by the web server 29. The ISP 5 provides Internet connectivity to the client computer system 21 through the modem interface 23 which is considered part of the client computer system 21. The client computer system is a personal computer system, a network computer, a Web TV system, a handheld device, or other such computer system. Similarly, the ISP 7 provides Internet connectivity for client systems 25, 35, and 37, although as shown in FIG. 10A, the connections are not the same for these three computer systems. Client computer system 25 is coupled through a modem interface 27 while client computer systems 35 and 37 are part of a LAN. While FIG. 10A shows the interfaces 23 and 27 as generically as a "modem," it will be appreciated that each of these interfaces is an analog modem, ISDN modem, cable modem, satellite transmission interface, or other interfaces for coupling a computer system to other computer systems. Client computer systems 35 and 37 are coupled to a LAN 33 through network interfaces 39 and 41, which is Ethernet network or other network interfaces. The LAN 33 is also coupled to a gateway computer system 31 which can provide firewall and other Internet related services for the local area network. This gateway computer system 31 is coupled to the ISP 7 to provide internet connectivity to the client computer systems 35 and 37. The gateway computer system 31 is a conventional server computer system. Also, the web server system 29 is a conventional server computer system.

Alternatively, as well-known, a server computer system 43 is directly coupled to the LAN 33 through a network interface 45 to provide files 47 and other services to the clients 35, 37, without the need to connect to the Internet through the gateway system 31. Furthermore, any combination of client systems 21, 25, 35, 37 may be connected together in a peer-to-peer network using LAN 33, Internet 3, or a combination as a communications medium. Generally, a peer-to-peer network distributes data across a network of multiple machines for storage and retrieval without the use of a central server or servers. Thus, each peer network node may incorporate the functions of both the client and the server described above.

FIG. 10B shows one example of a conventional computer system that is used as a client computer system or a server computer system or as a web server system. It will also be appreciated that such a computer system is used to perform many of the functions of an Internet service provider, such as ISP 5. The computer system 51 interfaces to external systems through the modem or network interface 53. It will be appreciated that the modem or network interface 53 is considered to be part of the computer system 51. This interface 53 is an analog modem, ISDN modem, cable modem, token ring interface, satellite transmission interface, or other interfaces for coupling a computer system to other computer systems. The computer system 51 includes a processing unit 55, which is a conventional microprocessor such as an Intel Pentium microprocessor or Motorola Power PC microprocessor. Memory 59 is coupled to the processor 55 by a bus 57. Memory 59 is dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which is a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 is implemented with conventional well known technology. A digital image input device 71 is a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which is an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that is used with the embodiments of the present invention. Network computers do not usually include a hard disk or other mass storage, and the executable programs are loaded from a network connection into the memory 59 for execution by the processor 55. A Web TV system, which is known in the art, is also considered to be a computer system according to the embodiments of the present invention, but it may lack some of the features shown in FIG. 10B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Although the invention as been described with reference to specific embodiments illustrated herein, this description is not intended to be construed in a limiting sense. It will be appreciated by those of ordinary skill in the art that any arrangement which is calculated to achieve the same purpose may be substituted for the specific embodiments shown and is deemed to lie within the scope of the invention. Accordingly, this application is intended to cover any such adaptations or variations of the present invention.

What is claimed is:

1. A computerized method comprising:
  generating, with a cluster content computer, a hierarchy of clusters of category data, the hierarchy comprises a plurality of levels of different sets of clusters, wherein at least one higher set of clusters is derived from a lower set of clusters and the generating the hierarchy includes,
    calculating similarity values between clusters in the lower set of clusters, the similarity values are based on a probability distribution for each cluster and an entropic distance metric, the probability distribution for each cluster is a probability of an occurrence of an attribute in the category data occurring in that cluster, and the entropic distance metric is a instance metric of cluster pairs in the lower set of clusters, and
    identifying a cluster pair in the lower set of clusters that minimizes the loss of information; and
  representing records of multimedia content as the hierarchy of clusters of category data, wherein the category data is defined in a vector space comprising multiple attributes, and wherein the records comprise category data.

2. The method of claim 1, wherein the deriving the at least one higher set of clusters comprising:
  merging clusters from the lower set of clusters together according to the entropic distance metric.

3. The method of claim 2, wherein successively merging clusters together comprises:
  determining a cluster pair in the lower set of clusters that has an entropic similarity characteristic value that satisfies the predetermined entropic similarity condition; and
  merging the selected cluster pair in the lower set of clusters into a single cluster for the at least one higher set of clusters.

4. The method of claim 3, further comprising:
  representing the merged cluster pair in the at least one higher set of clusters; and
  mapping non-merged clusters into the at least one higher set of clusters.

5. The method of claim 3, wherein selecting a cluster pair comprises selecting a cluster pair that has a minimum entropic divergence.

6. The method of claim 3, wherein selecting a cluster pair comprises selecting a cluster pair that has a maximum entropic proximity.

7. The method of claim 1, further comprising:
  mapping each record onto a system ontology; and
  cleaning at least one record.

8. The method of claim 7, wherein cleaning a record comprises at least one of removing terms from attributes of the record, splitting attributes of the record into a plurality of sub-attributes, and replacing terms in attributes of the record.

9. The method of claim 1, further comprising:
  generating a distance matrix representing possible combinations of clusters present within a current hierarchy layer.

10. A machine-readable storage medium having executable instructions to a cause a machine to perform a method comprising:
  generating a hierarchy of clusters of category data, the hierarchy comprises a plurality of levels of different sets of clusters, wherein at least one higher set of clusters derived from a lower set of clusters and the generating the hierarchy includes,
    calculating similarity values between clusters in the lower set of clusters, the similarity values are based on a probability distribution for each cluster and an entropic distance metric, the probability distribution for each cluster is a probability of an occurrence of an attribute in the category data occurring in that cluster, and the entropic distance metric is a distance metric of cluster pairs in the lower set of clusters, and
    identifying a cluster pair in the lower set of clusters that minimizes the loss of information; and
  representing records of multimedia content as the hierarchy of clusters of category data, wherein the category data is defined in a vector space comprising multiple attributes, and wherein the records comprise category data.

11. The machine-readable storage medium of claim 10, wherein the wherein the deriving the at least one higher set, of clusters comprises:
  merging clusters from the lower set of clusters together according to the entropic distance metric.

12. The machine-readable storage medium of claim 11, wherein the method further comprises:
  determining a cluster pair at the lower set of clusters that has an entropic similarity characteristic value that satisfies the predetermined entropic similarity condition; and
  merging the selected cluster pair at the lower set of clusters into a single cluster for the at least one higher set of clusters.

13. The machine-readable storage medium of claim 12, wherein the method further comprises:
  representing the merged cluster pair in the at least one higher set of clusters; and
  mapping non-merged clusters into the at least one higher set of clusters.

14. The machine-readable storage medium of claim 12, wherein selecting a cluster pair comprises selecting a cluster pair that has a minimum entropic divergence.

15. The machine-readable storage medium of claim 12, wherein selecting a cluster pair comprises selecting a cluster pair that has a maximum entropic proximity.

16. The machine-readable storage medium of claim 10, wherein the method
further comprises:
mapping each record onto a system ontology; and
cleaning at least one record.

17. The machine-readable storage medium of claim 16, wherein cleaning a record comprises at least one of removing terms from attributes of the record, splitting attributed of the record into a plurality of sub-attributes, and replacing terms in attributes of the record.

18. The machine-readable storage medium of claim 10, wherein the method further comprises:
generating a distance matrix representing possible combinations of clusters present within a current hierarchy layer.

19. A computerized system comprising:
a processor coupled to a memory through a bus; and
a process executed from the memory by the processor to cause the processor to: generate a hierarchy of clusters of category data, the hierarchy comprises a plurality of levels of different sets of clusters, wherein at least one higher set of clusters derived from a lower set of clusters and the generation of the hierarchy further causes the processor to calculate similarity values between clusters in the lower set of clusters, the similarity values are based on a probability distribution for each cluster and an entropic distance metric, the probability distribution for each cluster is a probability of an occurrence of an attribute in the category data occurring in that cluster, and the entropic distance metric is a distance metric of cluster pairs in the lower set of clusters, and to identify a cluster pair in the lower set of clusters that minimizes the loss of information, and represent records of multimedia content as the hierarchy of clusters of category data, wherein the category data is defined in a vector space comprising multiple attributes, and wherein the records comprise category data.

20. The system of claim 19, wherein the deriving the at least one higher set of clusters comprises:
merging clusters from the lower set of clusters together according to the entropic distance metric.

21. The method of claim 20, wherein the process further causes the processor to:
determine a cluster pair in the lower set of clusters that has an entropic similarity characteristic value that satisfies the predetermined entropic similarity condition; and
merge the selected cluster pair in the lower set of clusters into a single cluster for the at least one higher set of clusters.

22. The system of claim 21, wherein the process further causes the processor to:
represent the merged cluster pair in the at least one higher set of clusters; and
map non-merged clusters into the at least one higher set of clusters.

23. The system of claim 21, wherein selecting a cluster pair comprises selecting a cluster pair that has a minimum entropic divergence.

24. The system of claim 21, wherein selecting a cluster pair comprises selecting a cluster pair that has a maximum entropic proximity.

25. The system of claim 19, wherein the process further causes the processor to:
map each record onto a system ontology; and
clean at least one record.

26. The system of claim 25, wherein cleaning a record comprises at least one of removing terms from attributes of the record, splitting attributes of the record into a plurality of sub-attributes, and replacing terms in attributes of the record.

27. The system of claim 19, wherein the process further causes the processor to:
generate a distance matrix representing possible combinations of clusters present within a current hierarchy layer.

28. A computerized method comprising:
creating, with a classifying content computer, an internal representation for each of a plurality of folders of records, wherein each folder internal representation is based on a first probability distribution of category data, the category data defined in a vector space comprising multiple attributes, and each of the first probability distributions corresponding to a folder includes a probability of occurrence that each of the multiple attributes occurs in that folder;
creating an internal representation for each of a plurality of records, wherein each record internal representation is based on a second probability distribution of category data and each of the second probability distributions corresponding to a record includes a probability of occurrence that each of the multiple attributes occurs in that record; and
classifying the plurality of records into the plurality of folders according to a predetermined entropic similarity condition using the plurality of first and second probability distributions.

29. The method of claim 28, wherein the plurality of folders is user-defined.

30. The method of claim 29, further comprising:
creating a distance matrix listing representing possible record and folder combinations.

31. The method of claim 30, wherein the record is classified in more than one folder.

32. The method of claim 29, further comprising:
assigning labels to folders within the plurality of folders.

33. The method of claim 28, further comprising:
creating a conditional likelihood matrix from the distance matrix, the conditional likelihood matrix representing a probability of occurrence of a folder relative to a given record.

34. The method of claim 28, further comprising:
creating a binary assignment matrix, wherein every record is classified in a single folder.

35. A machine-readable storage medium having executable instructions to cause a processor to perform a method, the method comprising:
creating an internal representation for each of a plurality of folders of records, wherein each folder internal representation is based on a first probability distribution of category data, the category data defined in a vector space comprising multiple attributes, and each of the first probability distributions corresponding to a folder includes a provability of occurrence that each of the multiple attributes occurs in that folder;
creating an internal representation for each of a plurality of records, wherein each record internal representation is based on a second probability distribution of category data and each of the second probability distributions corresponding to a record includes a probability of occurrence that each of the multiple attributes occurs in that record; and classifying the plurality of records into the plurality of folders according to a predetermined entropic similarity condition using the plurality of the first and second probability distributions, and wherein the records comprise the category data.

36. The machine-readable storage medium of claim 35, wherein the plurality of folders is user-defined.

37. The machine-readable storage medium of claim 36, wherein the method further causes the processor to create a distance matrix listing representing possible record and folder combinations.

38. The machine-readable storage medium of claim 37, wherein the record is classified in more than one folder.

39. The machine-readable storage medium of claim 37, wherein the method further causes the processor to create a binary assignment matrix, wherein every record is classified in a single folder.

40. The machine-readable storage medium of claim 35, wherein the method further causes the processor to assign labels to the folders.

41. The machine-readable storage medium of claim 35, wherein the method further causes the processor to create a conditional likelihood matrix from the distance matrix listing probability of occurrence of folder, given a record.

42. A computer system comprising:
a processor coupled to a memory through a bus; and
a process executed from the memory by the processor to cause the processor to create an internal representation for each of a plurality of folders of records, wherein each folder internal representation is based on a probability distribution of category data, the category data defined in a vector space comprising multiple attributes, and each of the probability distributions corresponding to a folder include a probability of occurrence that each of the multiple attributes occurs in that folder, to create an internal representation for each of a plurality of records, wherein each record internal representation is based on a second probability distribution of category data and each of the second probability distributions corresponding to a record includes a probability of occurrence that each of the multiple attributes occurs in that record, and to classify the plurality of records into the plurality of folders according to a predetermined entropic similarity condition using the plurality of first and second probability distributions, wherein the records comprise category data.

43. The computer system of claim 42, wherein the processor further causes the processor to receive a user-defined plurality of folders.

44. The computer system of claim 42, wherein the processor further causes the processor to:
create a distance matrix representing possible record and folder combinations;
assign labels to the folders; and
compute a conditional likelihood matrix from the distance matrix listing a probability of occurrence of a folder relative to a given record.

* * * * *